United States Patent
Kerselaers et al.

(10) Patent No.: US 11,777,216 B2
(45) Date of Patent: Oct. 3, 2023

(54) NEAR-FIELD COMMUNICATIONS DEVICE

(71) Applicant: NXP B.V., Eindhoven (NL)

(72) Inventors: Anthony Kerselaers, Herselt (BE); Liesbeth Gommé, Anderlecht (BE)

(73) Assignee: NXP B.V., Eindhoven (NL)

(*) Notice: Subject to any disclaimer, the term of this patent is extended or adjusted under 35 U.S.C. 154(b) by 1549 days.

(21) Appl. No.: 15/935,420

(22) Filed: Mar. 26, 2018

(65) Prior Publication Data

US 2019/0296439 A1    Sep. 26, 2019

(51) Int. Cl.
*H01Q 1/27* (2006.01)
*H01Q 7/00* (2006.01)
*H04B 5/00* (2006.01)

(52) U.S. Cl.
CPC ............. *H01Q 7/00* (2013.01); *H01Q 1/273* (2013.01); *H04B 5/0081* (2013.01)

(58) Field of Classification Search
CPC ........ H01Q 7/00; H01Q 1/273; H04B 5/0081; H04B 5/0025; H04B 5/0031
See application file for complete search history.

(56) References Cited

U.S. PATENT DOCUMENTS

| | | | |
|---|---|---|---|
| 9,197,986 B1 | 11/2015 | Kerselaers et al. | |
| 9,728,843 B2 * | 8/2017 | Hunter | H01Q 1/273 |
| 9,819,075 B2 | 11/2017 | Kerselaers et al. | |
| 9,819,097 B2 | 11/2017 | Kerselaers et al. | |
| 2003/0169207 A1 * | 9/2003 | Beigel | H01Q 1/273 343/718 |
| 2014/0217175 A1 | 8/2014 | Fogg et al. | |
| 2017/0365909 A1 | 12/2017 | Wu et al. | |
| 2019/0197385 A1 * | 6/2019 | Finn | H01Q 7/00 |

FOREIGN PATENT DOCUMENTS

| | | |
|---|---|---|
| CN | 105375106 | 3/2016 |
| CN | 106981722 | 7/2017 |
| CN | 206878170 U | 1/2018 |
| EP | 3242355 A1 | 11/2017 |
| JP | 2014023012 | 2/2014 |
| WO | WO-03/077361 A1 | 9/2003 |

* cited by examiner

*Primary Examiner* — Hai V Tran
*Assistant Examiner* — Michael M Bouizza (57) ABSTRACT

One example discloses a near-field communications device, including: a near-field antenna; a conformal material having a first surface and a second surface; wherein the first surface is dielectrically coupled to the antenna; and wherein the second surface is configured to be galvanically coupled to a host-structure.

18 Claims, 9 Drawing Sheets

NEAR-FIELD COMMUNICATIONS DEVICE

The present specification relates to systems, methods, apparatuses, devices, articles of manufacture and instructions for near-field communications.

SUMMARY

According to an example embodiment, a near-field communications device, comprising: a near-field antenna; a conformal material having a first surface and a second surface; wherein the first surface is dielectrically coupled to the antenna; and wherein the second surface is configured to be galvanically coupled to a host-structure.

In another example embodiment, the dielectric coupling includes an insulating dielectric between the first conformal surface and the antenna.

In another example embodiment, the insulating dielectric is at least one of: a polymer, plastic, ABS, leather, cotton, FR4 material, a wristwatch band, clothing, a non-metallic layer, or printed circuit board.

In another example embodiment, the galvanic coupling between the second surface and the host structure is at least one of: a carbon impregnated polyurethane foam; a conductive fiber mesh, conductive particle doped material, or a metallic layer.

In another example embodiment, the conformal material has a uniform conductivity.

In another example embodiment, the first surface of the conformal material has a first conductivity; and the second surface of the conformal material has a second conductivity.

In another example embodiment, the conformal material includes an inner core; and the inner core of the conformal material has a third conductivity.

In another example embodiment, the conformal material is adaptive in thickness in response to spatial movements between the near-field antenna and the host-structure.

In another example embodiment, the conformal material has conductive properties that are at least one of: single layered, multilayered, uniform, isotropic, anisotropic, homogeneous, or non-homogeneous.

In another example embodiment, the conformal material has a non-homogeneous pattern of low and higher conductivity regions; and the higher conductivity regions are located where the conformal material is most likely to contact the host-structure.

In another example embodiment, the conformal material has a resistance less than 100 KOhms/cm$^2$.

In another example embodiment, the host-structure is either an organic structure or a biological surface.

In another example embodiment, the host-structure is at least one of: an inorganic structure, a package, clothing, a vehicle surface, a chair, a wall, and/or a merchandise item.

In another example embodiment, the antenna includes, a conductive plate configured to conduct near-field electric energy; and the first surface is dielectrically coupled to the conductive plate.

In another example embodiment, further comprising a rigid planar substrate; and wherein the substrate is coupled to and in between the antenna and the conformal material.

In another example embodiment, the conformal material is coupled to only one side of the rigid planar substrate.

In another example embodiment, the antenna includes, a coil configured to radiate near-field magnetic energy; a conductive plate configured to conduct near-field electric energy; and wherein the coil and conductive plate are planar.

In another example embodiment, the near field communications device is embedded in at least one of: a body area network device, a body sticker, a smart watch, a wrist band, an earbud, or eye glasses.

According to an example embodiment, a near-field medical sensing device, comprising: a near-field antenna; a conformal material having a first surface and a second surface; wherein the first surface is dielectrically coupled to the antenna; and wherein the second surface is configured to be galvanically coupled to a host-structure.

According to an example embodiment, a wearable material embedded with a near-field communications device, comprising: a near-field antenna; a conformal material having a first surface and a second surface; wherein the first surface is dielectrically coupled to the antenna; and wherein the second surface is configured to be galvanically coupled to a host-structure.

The above discussion is not intended to represent every example embodiment or every implementation within the scope of the current or future Claim sets. The Figures and Detailed Description that follow also exemplify various example embodiments.

Various example embodiments may be more completely understood in consideration of the following Detailed Description in connection with the accompanying Drawings, in which:

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

Near-field electromagnetic induction (NFEMI) communications is based on non-propagating quasi-static electric and magnetic fields. In contrast, RF wireless communication is based on propagating RF plane waves through free space.

The quasi-static characteristic of the near-fields is the result of antenna dimensions in combination with the carrier frequency. Most of the near-field energy is stored in the form of magnetic and electric fields, however a small amount of RF energy inevitably propagates in free space.

Small antenna geometries are good NFEMI antennas since they do not generate radiating waves in free space. Such an antenna can be composed of a coil antenna (magnetic antenna) in conjunction with a short loaded dipole (e.g. electric antenna). Near of the body it will provide fields that are confined near the body.

Figure 1A:
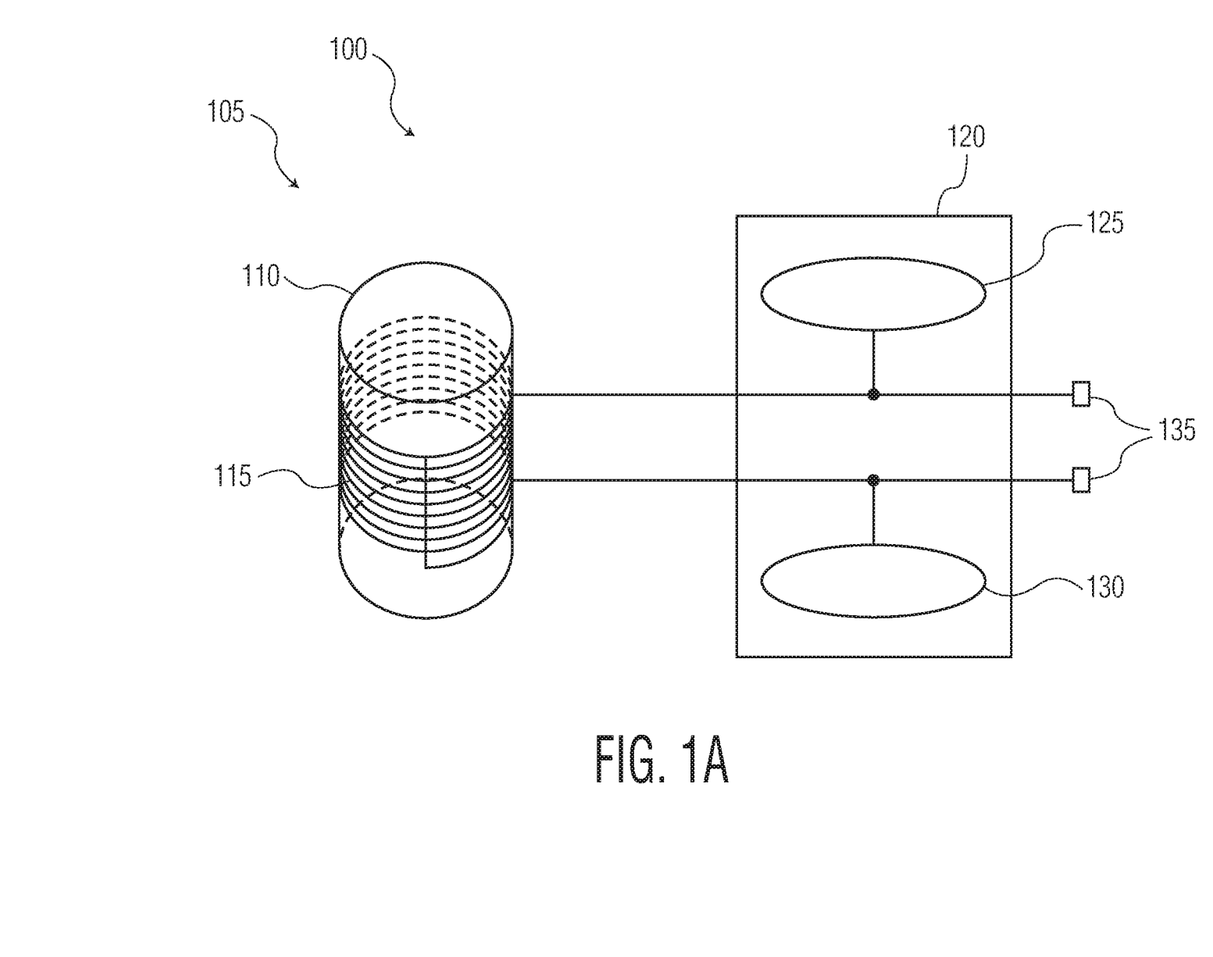
FIG. 1A is an example idealized single coil near-field electromagnetic induction (NFEMI) communications device.

FIG. 1A is an example idealized single coil near-field electromagnetic induction (NFEMI) communications device 100. The device 100 includes a coil portion 105 (e.g. magnetic energy antenna) in conjunction with a short loaded dipole portion 120 (e.g. electric energy antenna). The coil 105 portion includes a ferrite core 110 with a wire 115 wound around the core 110. The short dipole 120 includes two conductive loading plates 125 and 130. Feed points 135 are connected to other transceiver, electronic, etc. circuitry.

When the device 100 is located near a host structure (e.g. a human body) this NFEMI device's 100 magnetic and electric near-fields will be confined near such host structure. Additionally, by operating at frequencies below 30 MHz, these near-fields will be further confined to the host structure and far field radiation will be strongly reduced.

Figure 1B:
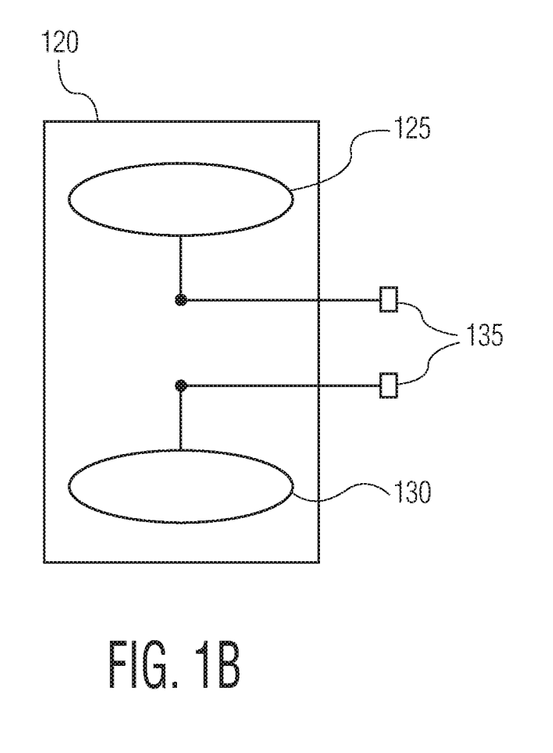
FIG. 1B is an example idealized near-field electric (NFE) communications device.

FIG. 1B is an example idealized near-field electric (NFE) communications device 120. The NFE device 120 is in this example equivalent to the single coil NFEMI device 100, but without the coil portion 105.

Figure 2:
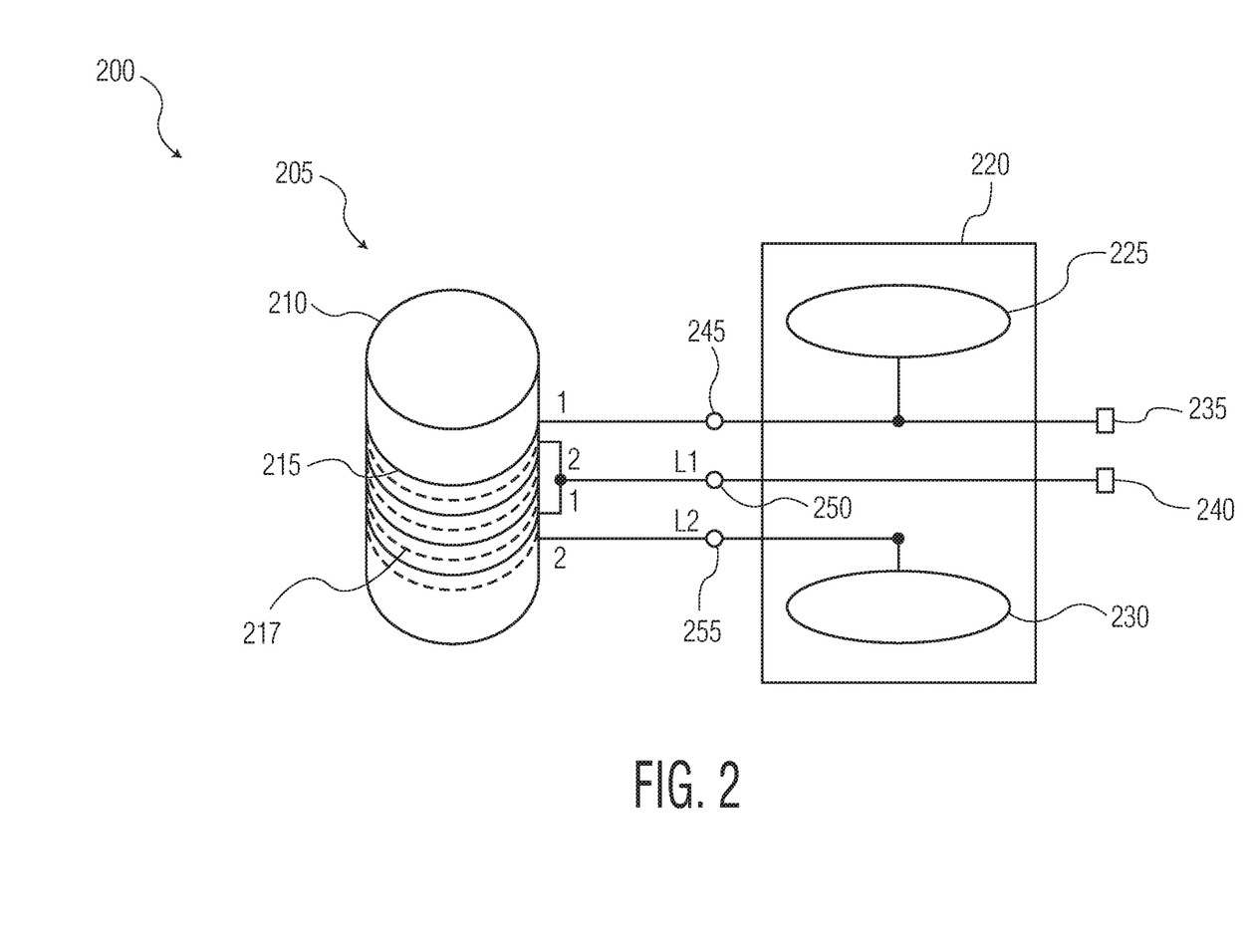
FIG. 2 is an example idealized dual coil NFEMI communications device.

FIG. 2 is an example idealized dual coil NFEMI communications device 200. The device 200 includes a short loaded dipole portion 220 with two conductive loading plates 225, 230 and a small loop antenna 205.

The small loop antenna includes at least two coupled coils 215 and 217. The first coil 215 has an inductance of L1, and the second coil 217 has an inductance of L2. Both coils 215 and 217 may be connected, at connection point 250, such that they form a larger inductance compared with the inductance of the first coil 215 and the second coil 217.

Figure 3A:
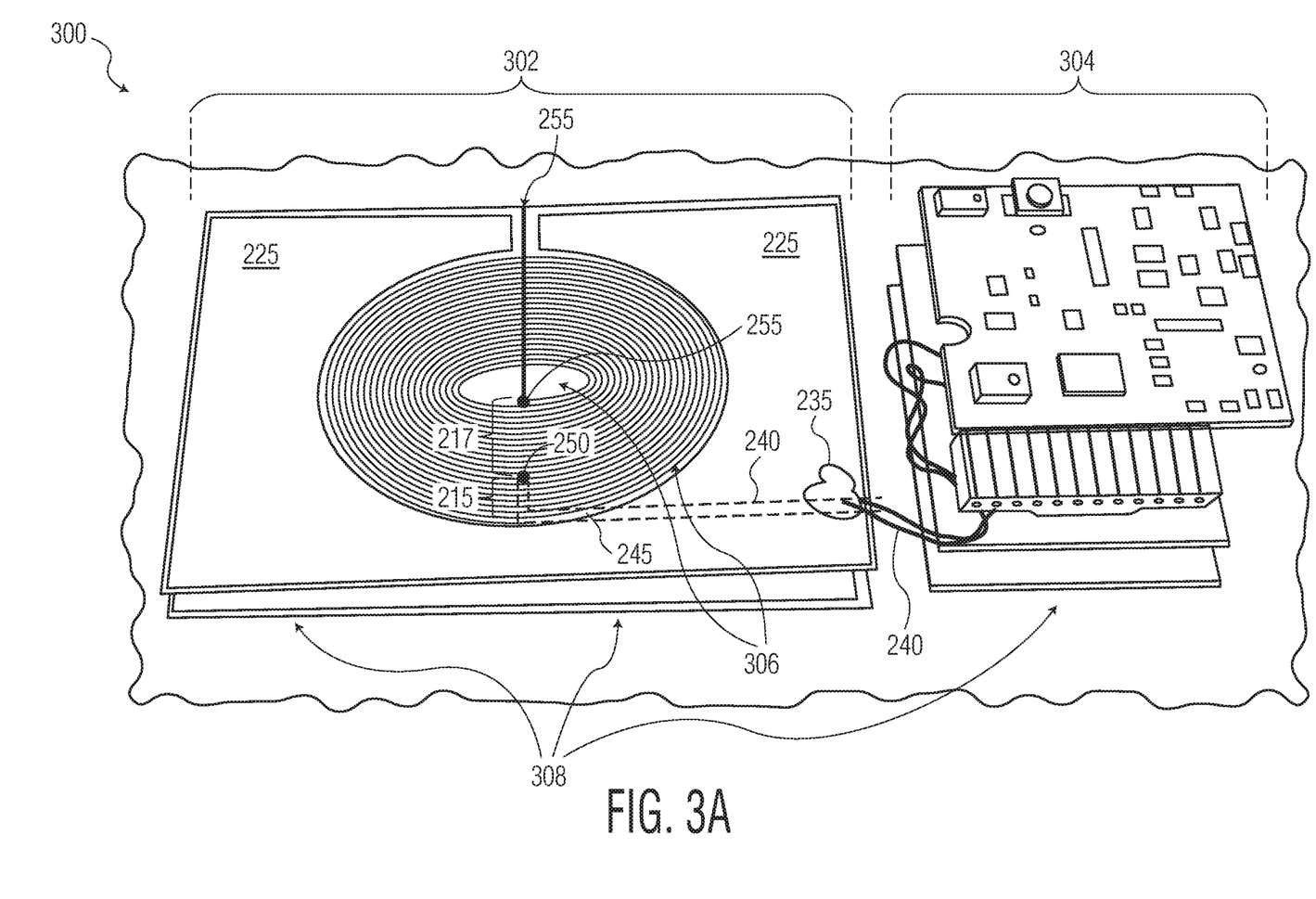
FIG. 3A is an example first side of a manufactured dual coil NFEMI device.
Figure 3B:
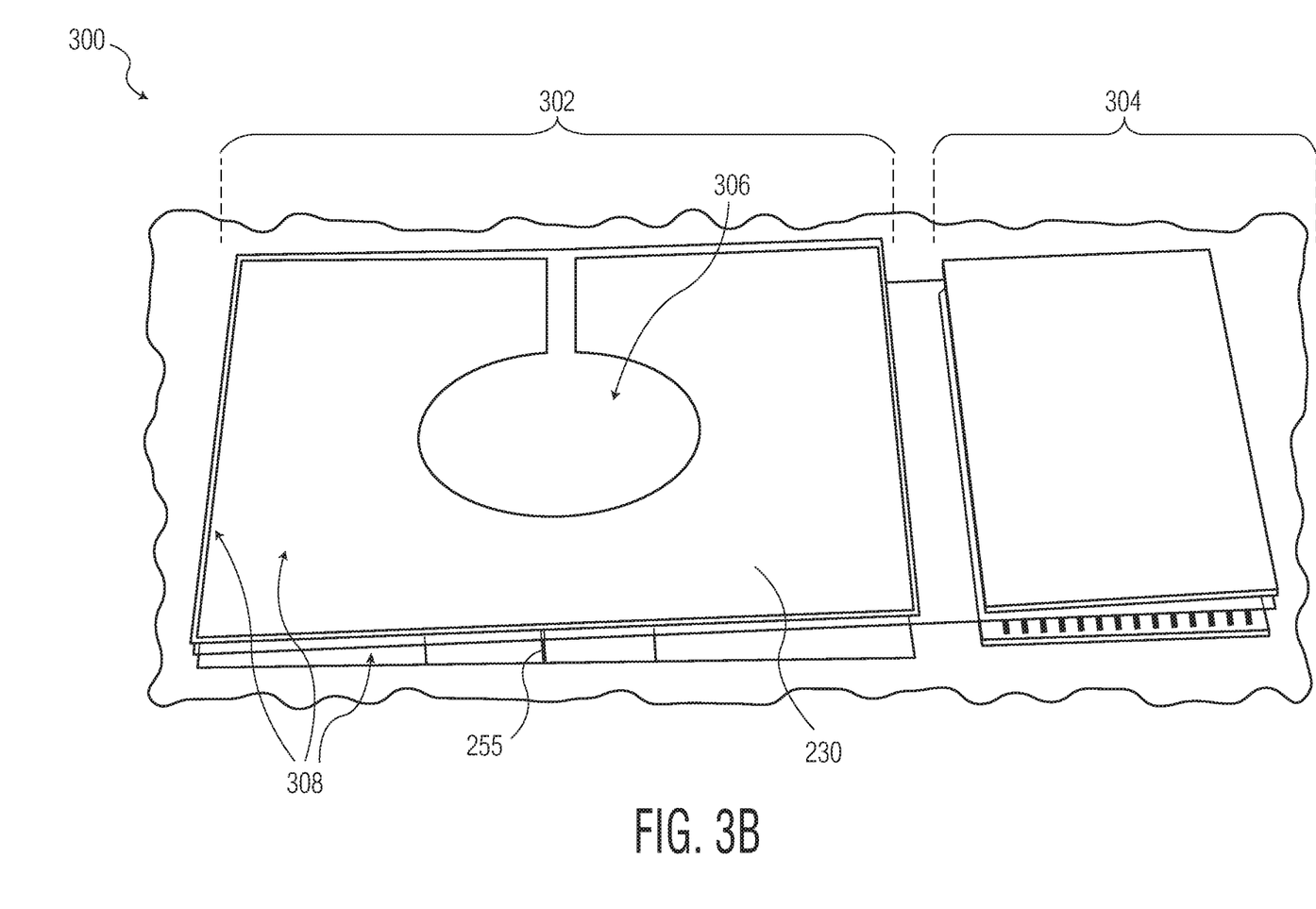
FIG. 3B is an example second side of the dual coil NFEMI device.

Both coils 215 and 217 may be air coils, wrapped around a ferrite core 210 (as shown in FIG. 2), or they can be in the form of a planar structure (see FIGS. 3A and 3B for an example planar coil structure).

In the ferrite core 210 version, the coils 215 and 217 may be wrapped around the core 210 in an interleaved fashion, or wrapped on top of one another, i.e., the second coil 217 is first wrapped around the core 210, and then the first coil 215 is then wrapped around the core 210 on top of the second coil 217.

Connection point 245 couples one end of the first coil 215 to a first feeding connection 235 and to the first plate of the small loaded dipole 225. Connection point 250 couples another end of the first coil 215 to one end of the second coil 217 and to a second feeding connection 240. Connection point 255 couples another end of the second coil 217 to the second plate 230 of the small loaded dipole 220. For clarity, connections 245, 250 and 255 are also shown in FIGS. 3A, 3B, 4A and 5A.

FIG. 3A is an example first side of a manufactured dual coil NFEMI device 300. FIG. 3B is an example second side of the dual coil NFEMI device 300. FIGS. 3A and 3B are now discussed together.

While, as will be discussed below, device 300 uses planar coils for its magnetic antenna fields, for the sake of clarity the discussion for FIGS. 3A and 3B will reuse reference numbers from the dual-coil device 200 discussed in FIG. 2 that uses ferrite wrapped coils for its magnetic antenna fields.

The device 300 includes a near-field antenna portion 302 and an electronic circuit portion 304 (e.g. a wireless module). The near-field antenna portion 302 includes a first planar coil 215 (L1) and a second planar coil 217 (L2) (i.e. near-field magnetic portion). The antenna 302 also includes a first conductive plate 225 and a second conductive plate 230 in a short loaded monopole configuration (i.e. near-field electric portion). The coils 215, 217 and plates 225, 230 in FIGS. 3A and 3B are operationally similar to the coils 215, 217 and plates 225, 230 in FIG. 2.

Both planar coils 215, 217 are electromagnetically coupled and connected in a series arrangement. Both coils 215, 217 are connected to form a larger inductance as compared just the inductance L1 of the first coil 215 or the inductance L2 of the second coil 217.

Both coils 215, 217 are coupled to an insulating dielectric 308 (e.g. carrier of plastic or other non-conductive material).

Connection 245 of the first coil 215 is connected to the first conductive plate 225 and to a first feeding connection 235. Connection 250 of the first coil 215 is connected to one end of the second coil 217 and to a second feeding connection 240. Connection 255 of the second coil 217 is connected to the second conductive plate 230.

As shown, conductive plates 225, 230 are spaced apart and both include a non-conductive area 306 overlapping both coils 215, 217.

Figure 4A:
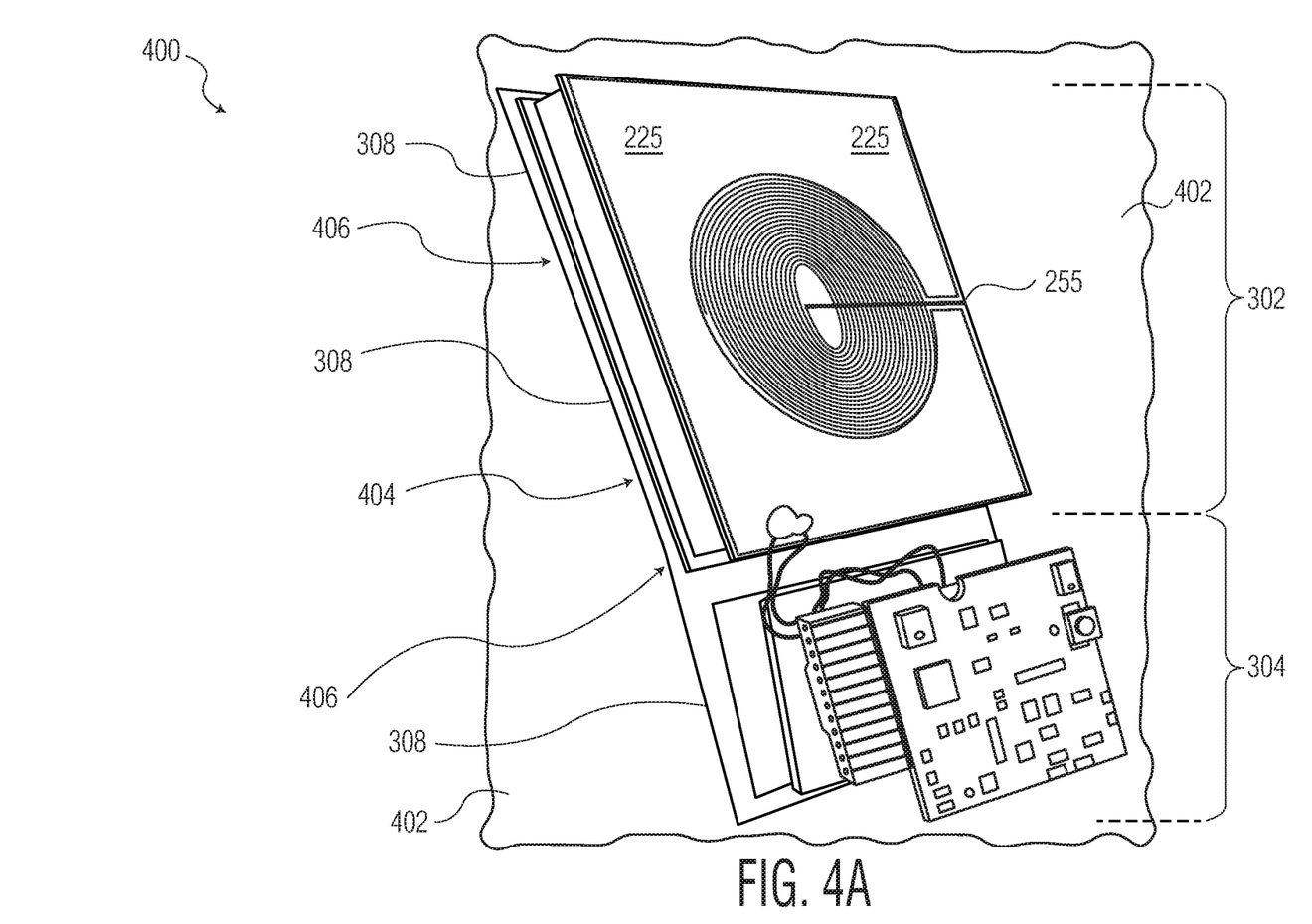
FIG. 4A is an example placement of the dual coil NFEMI device, proximate to a host structure.

FIG. 4A is an example placement 400 of the dual coil NFEMI device 300, proximate to a host structure 402 (e.g. a human torso).

The host-structure 402 in some example embodiments can be at least one of: an organic structure, a biological surface, an inorganic structure, a package, human skin, clothing, a vehicle surface, a chair, a wall, and/or a merchandise item.

The second conductive plate 230 of the dual coil NFEMI device 300 is proximate to the host-structure 402. The insulating dielectric 308 layer is between the second conductive plate 230 and the host-structure 402. In various example embodiments, the insulating dielectric 308 layer is: a thin layer of insulating material, plastic, ABS, leather, etc.

Additionally, when the device 300 is placed proximate to the host structure 402 there is also a set of gap 406 layers (e.g. air pockets) in addition to a contact area 404 (e.g. portion of the insulating dielectric 308 layer that actually touches the host-structure 402).

When more than one NFEMI device 300 (e.g. a set of wireless NFEMI devices) is coupled to the host-structure 402 together they can be configured to form a communication network (e.g. a body area network). Their communication's link budget is calculated as:

$$\text{Link Budget [dB]} = 20 \log_{10}(V_{Rx}/V_{Tx})$$

where VTx is the transmitter voltage on the transmitter antenna and VRx is the received voltage on the receiver antenna.

Given a preselected transmitter voltage VTx, the received voltage VRx on the receiver antenna is dependent upon a coupling of the near-field antenna portions 302 of the devices 300 and the host-structure 402.

For example, when the second conductive plate 230 is uniformly (i.e. equally) close to the host-structure 402, there is a higher link budget than if there is a larger distance between the host-structure 402 and the second conductive plate 230.

However, sets of gaps 406 create a non-uniform (i.e. changing) distance between the second conductive plate 230 and the host-structure 402. Due to this irregular coupling distance between 230 and 402 (e.g. due to a shape of a human body), the link budget is degraded (i.e. reduced).

Figure 4B:
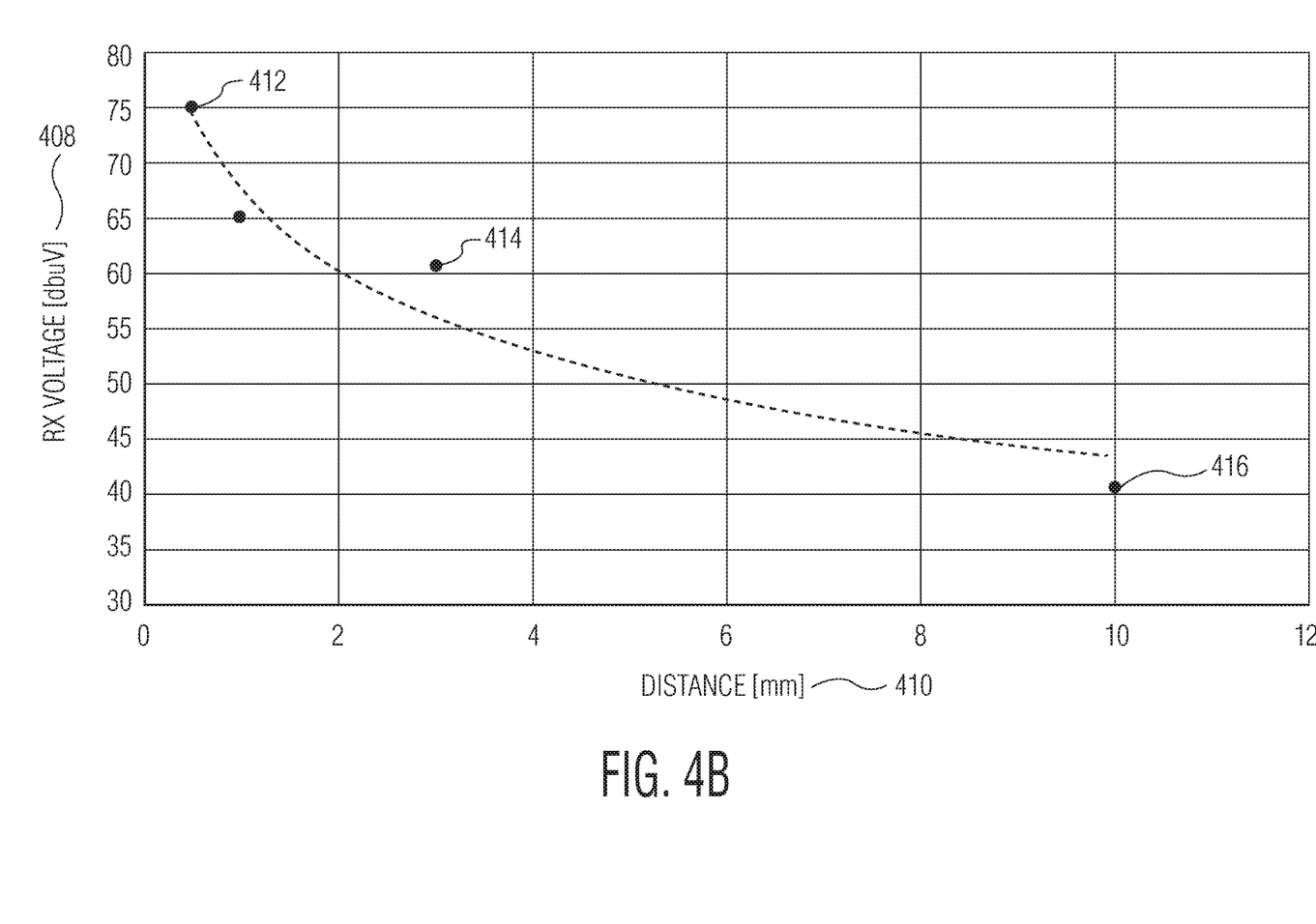
FIG. 4B is an example signal strength as a function of distance between the dual coil NFEMI device and the host structure.

FIG. 4B is an example signal strength 408 (e.g. link budget) as a function of distance 410 between the dual coil NFEMI device 300 and the host structure 402.

For example, at less than 1 mm distance 412, the signal strength 408 is 75 dB μV; however, at a 3 mm distance 414, the signal strength 408 is reduced by about 15 dB (a significant degradation). Going further, at 10 mm distance 416, the signal strength 408 is reduced by a substantially greater 35 dB.

Figure 5A:
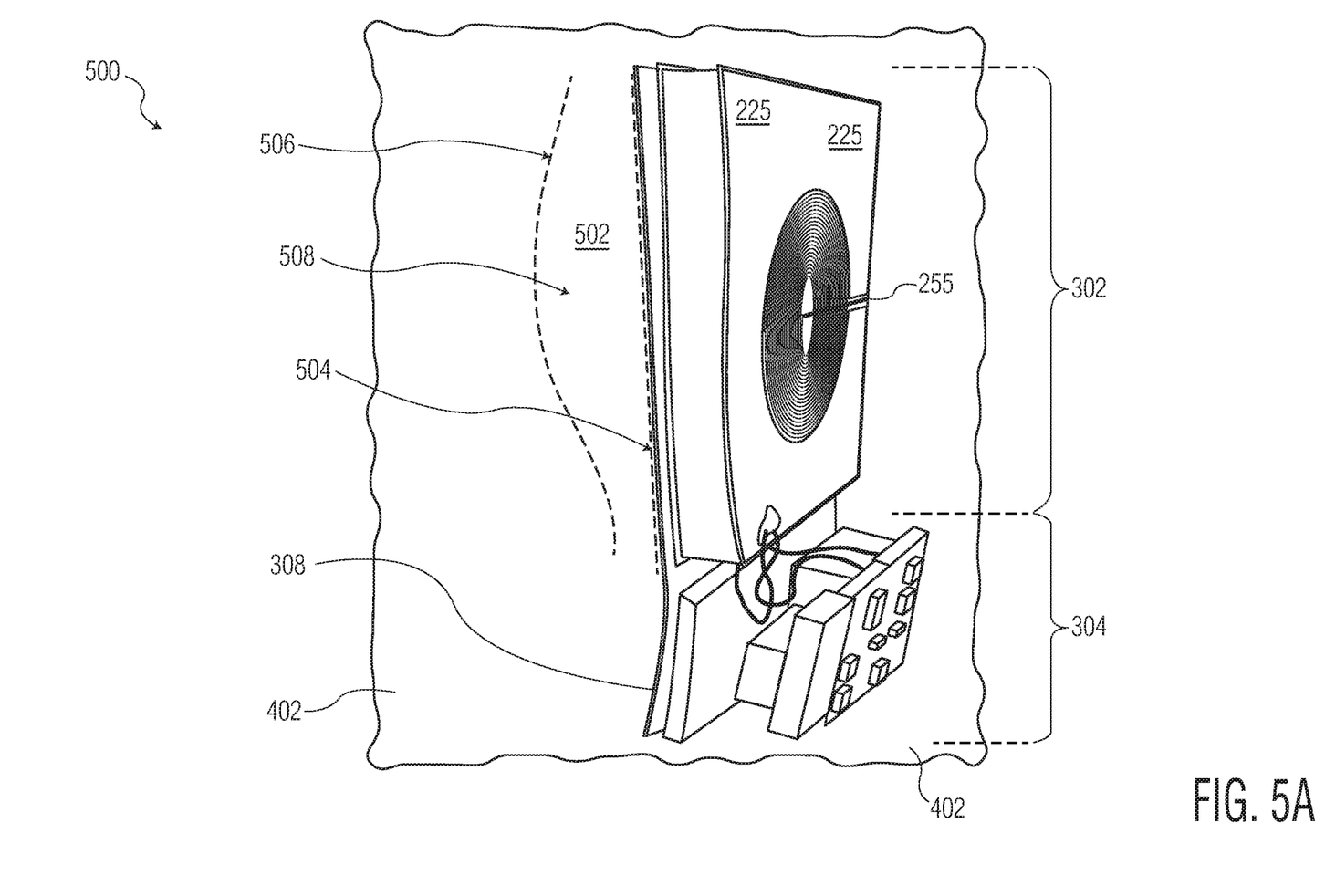
FIG. 5A is an example placement of a second embodiment of the dual coil NFEMI device proximate to the host structure.

FIG. 5A is an example placement 500 of a second embodiment of the dual coil NFEMI device 300 proximate to the host structure.

The second version of the device 300 in the example placement 500 includes a conformal material 502. The conformal material 502 includes a first surface 504, a second surface 506, and an inner core 508 region.

The first surface of the conformal material 502 is dielectrically coupled to the antenna, and the second surface of the conformal material 502 is configured to be galvanically coupled to a host-structure.

The galvanic coupling between the second surface 506 and the host structure 402 in some example embodiments is at least one of: a carbon impregnated polyurethane foam; a conductive fiber mesh, conductive particle doped material, or a metallic layer. Such materials are non-corrosive and form a cushion between the skin and the insulating dielectric 308 layer.

The conformal material 502, in various example embodiments, can have a uniform conductivity, or a single layered, multilayered, isotropic, anisotropic, homogeneous, or non-homogeneous conductivity. In some example embodiments, the conformal material 502 is a low conductivity having a resistance of 1K to 100 KOhms/cm$^2$. The conformal material 502 is selected to have conductivity at the device's 300 operating frequencies.

In an example embodiment, the conformal material 502 has a non-homogeneous pattern of low and higher conductivity regions, and the higher conductivity regions are located where the conformal material 502 is most likely to contact the host-structure.

In some example embodiments, the first surface 504 of the conformal material 502 has a first conductivity; the second surface 506 of the conformal material 502 has a second conductivity; and an inner core (e.g. fiber mesh) of the conformal material 502 has a third conductivity. In some example embodiments, the first surface 504 is dielectrically coupled to one of the conductive plates 225, 230 of the antenna 302 using the insulating dielectric 308 layer.

In one example embodiment, the insulating dielectric 308 layer is a rigid planar substrate, and the substrate is coupled to and in between the antenna 302 and the conformal material 502.

In various applications, an area between the insulating dielectric 308 layer next to the second conductive plate 230 and the host-structure 402 is filled with the conformal material 502. The conformal material 502, by conforming (e.g. physically/spatially adapting) to the gap 406 areas (shown in FIG. 4A), significantly boosts the link budget and thus improves communication robustness.

In some applications, the conformal material 502 completely fills all the gaps 406; however, even if some gap 406 areas remain, the link budget is still boosted.

The conformal material 502 is, in many example embodiments, is adaptive in thickness in response to spatial movements between the near-field antenna 302 and the host-structure.

The host-structure 402 can be an organic structure (e.g. a biological surface such as human skin) or various inorganic structures, such as a package, an article of clothing, a vehicle surface, a chair, a wall, and/or a merchandise item.

The near field communications device 300 can be embedded in a body area network device, a body sticker, a smart watch, a wrist band, an earbud, or eye glasses.

Figure 5B:
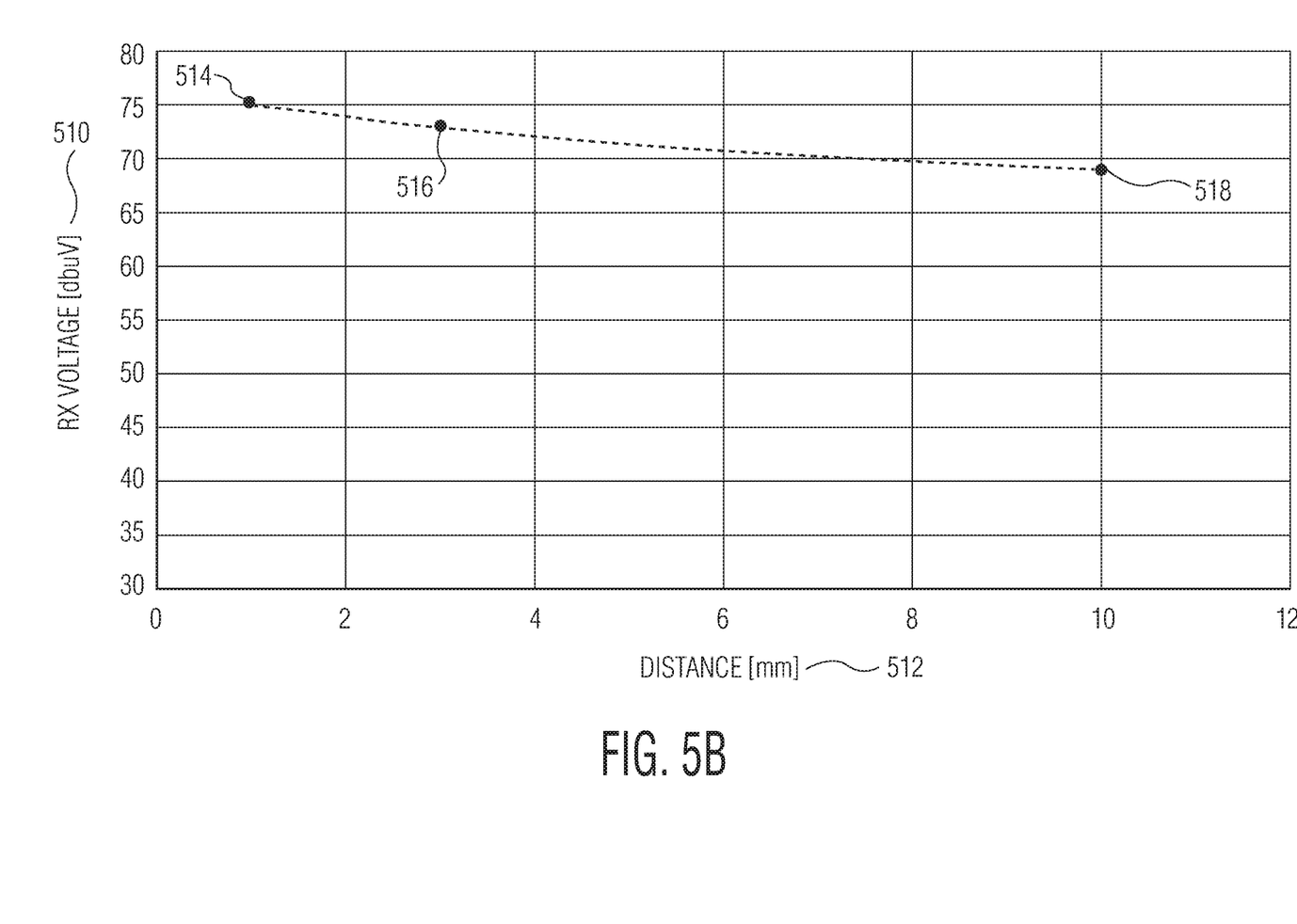
FIG. 5B is an example signal strength as a function of distance between the second embodiment of the second dual coil NFEMI device and the host structure.

FIG. 5B is an example signal strength 510 as a function of distance 512 between the second embodiment of the dual coil NFEMI device 300 and the host structure 402.

For example, at 1 mm distance 514, the signal strength 510 is as before at 75 dBμV; however, at a 3 mm distance 516, the signal strength 510 is reduced by only 3 dB (a significant improvement from the prior 15 dB degradation of the device 300 without the conformal material 502). Even going further, at 10 mm distance 518, the signal strength 510 is still only reduced by 6 dB (again, a significant improvement from the prior 35 dB degradation of the device 300 without the conformal material 502).

Thus degradation of the signal strength 510 due to the conformal material 502 is significantly reduced.

Thus by adding a conformal material to the various example embodiments of NFEMI device 100, 200, 300 discussed above, improves a reliability of the near-field networks that use them. Such near-field networks can be on a human body in a medical or consumer lifestyle setting and/or in material handling, in-vehicle networks and other market segments that use near-fields. By increasing the near-field communication range between these wireless devices further and/or more robust applications are possible.

Various instructions and/or operational steps discussed in the above Figures can be executed in any order, unless a specific order is explicitly stated. Also, those skilled in the art will recognize that while some example sets of instructions/steps have been discussed, the material in this specification can be combined in a variety of ways to yield other examples as well, and are to be understood within a context provided by this detailed description.

In some example embodiments these instructions/steps are implemented as functional and software instructions. In other embodiments, the instructions can be implemented either using logic gates, application specific chips, firmware, as well as other hardware forms.

When the instructions are embodied as a set of executable instructions in a non-transient computer-readable or computer-usable media which are affected on a computer or machine programmed with and controlled by said executable instructions. Said instructions are loaded for execution on a processor (such as one or more CPUs). Said processor includes microprocessors, microcontrollers, processor modules or subsystems (including one or more microprocessors or microcontrollers), or other control or computing devices. A processor can refer to a single component or to plural components. Said computer-readable or computer-usable storage medium or media is (are) considered to be part of an article (or article of manufacture). An article or article of manufacture can refer to any manufactured single component or multiple components. The non-transient machine or computer-usable media or mediums as defined herein excludes signals, but such media or mediums may be capable of receiving and processing information from signals and/or other transient mediums.

It will be readily understood that the components of the embodiments as generally described herein and illustrated in the appended figures could be arranged and designed in a wide variety of different configurations. Thus, the detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

What is claimed is:

1. A near-field communications device, comprising:
a near-field antenna that includes a first conductive plate and a second conductive plate separated by and coupled to a non-conductive area;
wherein the first and second conductive plates are configured to conduct near-field electric energy;
a conformal material having a first surface and a second surface;
wherein the second conductive plate and first surface of the conformal material are separated by and coupled to a rigid planar dielectric substrate; and
wherein the second surface is configured to be galvanically coupled to a host-structure.

2. The device of claim 1:
wherein the dielectric coupling includes an insulating dielectric between the first conformal surface and the antenna.

3. The device of claim 2:
wherein the insulating dielectric is at least one of: a polymer, plastic, ABS, leather, cotton, FR4 material, a wristwatch band, clothing, a non-metallic layer, or printed circuit board.

4. The device of claim 1:
wherein the galvanic coupling between the second surface and the host structure is at least one of: a carbon impregnated polyurethane foam; a conductive fiber mesh, conductive particle doped material, or a metallic layer.

5. The device of claim 1:
wherein the conformal material has a uniform conductivity.

6. The device of claim 1:
wherein the first surface of the conformal material has a first conductivity; and
wherein the second surface of the conformal material has a second conductivity.

7. The device of claim 6:
wherein the conformal material includes an inner core; and
wherein the inner core of the conformal material has a third conductivity.

8. The device of claim 1:
wherein the conformal material is adaptive in thickness in response to spatial movements between the near-field antenna and the host-structure.

9. The device of claim 1:
wherein the conformal material has conductive properties that are at least one of: single layered, multilayered, uniform, isotropic, anisotropic, homogeneous, or non-homogeneous.

10. The device of claim 1:
wherein the conformal material has a non-homogeneous pattern of low and higher conductivity regions; and
wherein the higher conductivity regions are located where the conformal material is most likely to contact the host-structure.

11. The device of claim 1:
wherein the conformal material has a resistance less than 100 KOhms/cm$^2$.

12. The device of claim 1:
wherein the host-structure is either an organic structure or a biological surface.

13. The device of claim 1:
wherein the host-structure is at least one of: an inorganic structure, a package, clothing, a vehicle surface, a chair, a wall, and/or a merchandise item.

14. The device of claim 1:
wherein the conformal material is coupled to only one side of the rigid planar substrate.

15. The device of claim 1:
wherein the antenna includes,
a coil configured to radiate near-field magnetic energy;
wherein the coil is planar.

16. The device of claim 1:
wherein the near field communications device is embedded in at least one of: a body area network device, a body sticker, a smart watch, a wrist band, an earbud, or eye glasses.

17. The device of claim 1:
wherein the near-field communications device is embedded within a medical sensing device.

18. The device of claim 1:
wherein the near-field communications device is embedded within a wearable material.

\* \* \* \* \*